(12) United States Patent
Brilman et al.

(10) Patent No.: US 10,027,418 B2
(45) Date of Patent: Jul. 17, 2018

(54) MITIGATING INTER-SYMBOL INTERFERENCE IN CODED LIGHT

(71) Applicant: PHILIPS LIGHTING HOLDING B.V., Eindhoven (NL)

(72) Inventors: Joost Jacob Brilman, Eindhoven (NL); Hugo Jose Kraijnc, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 15 days.

(21) Appl. No.: 15/241,716

(22) Filed: Aug. 19, 2016

(65) Prior Publication Data

US 2017/0078026 A1 Mar. 16, 2017

(30) Foreign Application Priority Data

Sep. 10, 2015 (EP) .................................. 15184610

(51) Int. Cl.
*H04B 10/524* (2013.01)
*H04B 10/116* (2013.01)
*H04B 10/50* (2013.01)
*H04B 10/079* (2013.01)
(Continued)

(52) U.S. Cl.
CPC ....... *H04B 10/524* (2013.01); *H04B 10/0795* (2013.01); *H04B 10/116* (2013.01); *H04B 10/504* (2013.01); *H04B 10/58* (2013.01); *H04L 25/03343* (2013.01)

(58) Field of Classification Search
CPC H04B 10/524; H04B 10/0795; H04B 10/504; H04B 10/116; H04B 10/58; H04L 25/03343
See application file for complete search history.

(56) References Cited

U.S. PATENT DOCUMENTS 6,445,476 B1 * 9/2002 Kahn ................... G02F 1/0327
359/245
8,880,982 B2 * 11/2014 Li ....................... H03M 13/258
714/755
(Continued)

FOREIGN PATENT DOCUMENTS

WO 2005109673 A1 11/2005
WO 2007059258 A1 5/2007

OTHER PUBLICATIONS

Ye-Shen Kuo, Book entitled "Software-Defined Lighting".

*Primary Examiner* — Danny Leung

(57) ABSTRACT

A method of controlling an input signal supplied from an encoder to a modulator, wherein the input signal causes modulation of a current flowing through a light source in order to embed data in light emitted by the light source. The method comprises: for each of a plurality of possible logical transitions allowed by the encoding scheme from an adjacently preceding symbol to a present symbol, determining a respective observed value for the current level of the present symbol; for each of the plurality of logical transitions, determining an associated error between the respective observed value and a corresponding one of a set of nominal values for the current levels; and based on the respective error for each of the plurality of logical transitions, applying a respective compensation to the corresponding input in order to bring the resulting current level closer to the corresponding nominal value.

13 Claims, 5 Drawing Sheets

(51) Int. Cl.
　　　*H04B 10/58*　　　(2013.01)
　　　*H04L 25/03*　　　(2006.01)

(56) References Cited

U.S. PATENT DOCUMENTS

| | | | | |
|---|---|---|---|---|
| 2005/0063456 | A1* | 3/2005 | McIntire | H04L 1/0045 |
| | | | | 375/212 |
| 2005/0286661 | A1* | 12/2005 | Kwak | H04B 1/7085 |
| | | | | 375/343 |
| 2008/0181272 | A1* | 7/2008 | Miller | H01S 5/0683 |
| | | | | 372/38.01 |
| 2009/0072895 | A1* | 3/2009 | Traa | H03M 1/1009 |
| | | | | 327/551 |
| 2011/0006684 | A1* | 1/2011 | Hodgson | H05K 1/0284 |
| | | | | 315/77 |
| 2012/0086803 | A1* | 4/2012 | Malzbender | G01B 11/026 |
| | | | | 348/140 |
| 2013/0015236 | A1* | 1/2013 | Porter | G06F 21/645 |
| | | | | 235/375 |
| 2013/0202310 | A1* | 8/2013 | Rietman | H05B 37/0272 |
| | | | | 398/128 |
| 2014/0321859 | A1* | 10/2014 | Guo | H04B 10/116 |
| | | | | 398/118 |
| 2015/0188627 | A1* | 7/2015 | Yuda | H04B 10/502 |
| | | | | 398/30 |
| 2017/0078026 | A1* | 3/2017 | Brilman | H04B 10/116 |
| 2017/0231042 | A1* | 8/2017 | Willaert | H05B 33/0815 |

\* cited by examiner

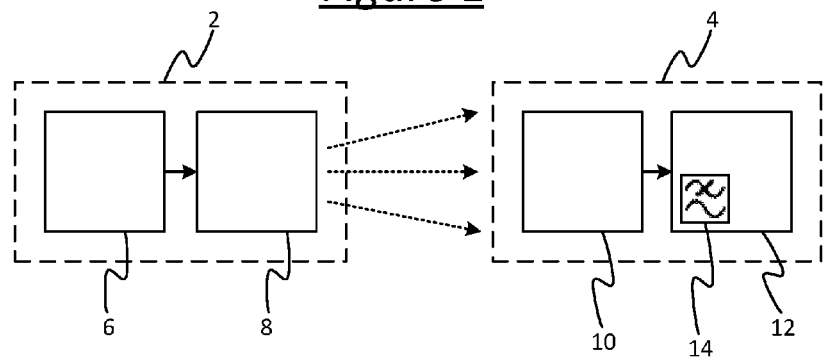
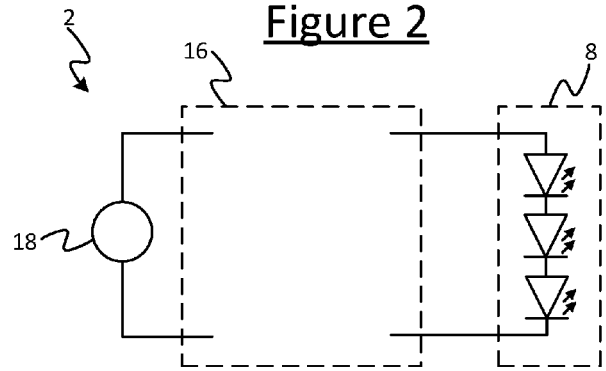
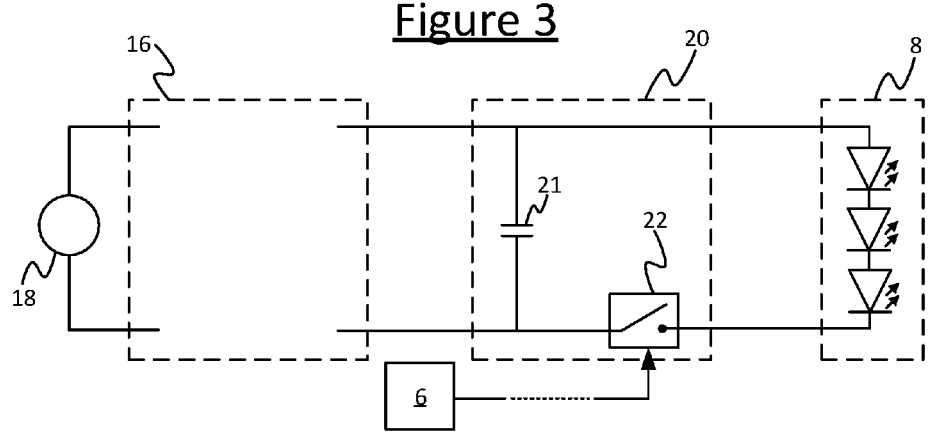

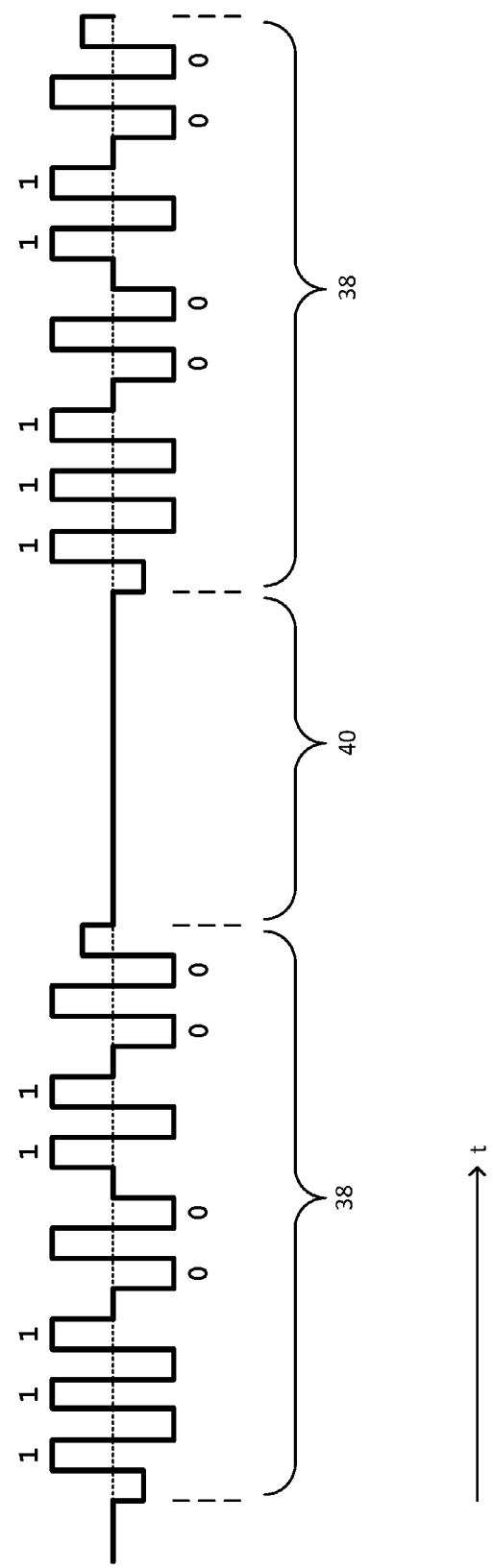

MITIGATING INTER-SYMBOL INTERFERENCE IN CODED LIGHT

TECHNICAL FIELD

The present disclosure relates to coded light, and particularly to the issue of inter-symbol interference in coded light.

BACKGROUND

Coded light refers to techniques whereby data is modulated into the light emitted by a light source, such as an LED-based light source. In this way the data may be said to be embedded into the light from the light source. For instance, data may be modulated into the illumination emitted by a luminaire such as an LED-based luminaire. Thus in addition to providing illumination to illuminate the environment (for which purpose a light source may already be present in the environment), the light source also acts as a transmitter capable of transmitting data to a suitable receiver of coded light. The modulation is typically performed at a high enough frequency that, despite the illumination being in the visible spectrum, the modulation is imperceptible to human vision. I.e. so the user only perceives the overall illumination and not the effect of the data being modulated into that illumination.

Data is modulated into the light by means of a technique such as amplitude keying or frequency shift keying, whereby the modulated property (e.g. amplitude or frequency) is used to represent channel symbols. The modulation typically involves a coding scheme to map data bits (sometimes referred to as user bits) onto such channel symbols. An example is a conventional Manchester code, which is a binary code whereby a user bit of value 0 is mapped onto a channel symbol in the form of a low-high pulse and a user bit of value 1 is mapped onto a channel symbol in the form of a high-low pulse. Another example is the recently developed ternary Manchester code.

There are a number of known techniques for detecting and decoding coded light at the receive side. For example, coded light can be detected using an everyday 'rolling shutter' type camera, as is often integrated into a mobile device like a mobile phone or tablet. In a rolling-shutter camera, the camera's image capture element is divided into a plurality of lines (typically horizontal lines, i.e. rows) which are exposed in sequence line-by-line. That is, to capture a given frame, first one line is exposed to the light in the target environment, then the next line in the sequence is exposed at a slightly later time, and so forth. Typically the sequence 'rolls' in order across the frame, e.g. in rows top to bottom, hence the name 'rolling shutter'. When used to capture coded light, this means different lines within a frame capture the light at different times and therefore, if the line rate is high enough relative to the modulation frequency, at different phases of the modulation waveform. Thus the modulation in the light can be detected. Coded light can also be detected by using a global shutter camera if the frame rate is high enough relative to the modulation frequency, or using a dedicated photocell with suitable sample rate.

A luminaire that supports transmission of coded light signals can enable many applications of interest.

For example, the data embedded in the illumination emitted by a light source may comprise an identifier of that light source. This identifier can then be detected by a remote control unit, and used to identify the light source in order to control it remotely via a back channel such as an RF back channel. E.g. the remote control unit may take the form of a smartphone or tablet running a remote control application (or "app"), in which case the light sensor may be the built-in camera of the device. The app detects the identifier using the camera, and then uses this to address the light source via an RF access technology such as Wi-Fi, ZigBee or Bluetooth.

In another example, the identifier can be used for navigation, or to provide other location-based information or functionality. This is achieved by providing a mapping between the identifier of the light source and a known location of the light source, and/or other information associated with the location. In this case a device such as a mobile phone or tablet which receives the light (e.g. through a built-in camera) can detect the embedded identifier and use it to look up the corresponding location and/or other information mapped to the identifier (e.g. in a location database accessed over a network such as the Internet). The purpose of looking up the location of the device could be to help the user of the device navigate, e.g. to find his or her way throughout a large building or complex such as a hospital; and/or to determine whether the device is entitled to access some location-based service such as the ability to control the lighting in a particular room. Or in the case of mapping other information to the identifier, this could be used to look up information relevant to the location in which the light source is deployed, such as to look up information about a museum exhibit in a certain room or zone of the museum.

In yet further applications, information other than just an identifier can be directly encoded into the light (as opposed to being looked up based on an ID embedded in the light). Thus coded light can be used as an alternative (or supplement) to radio-based means of broadcasting any arbitrary data content that might be desired for the application in question.

Thus coded light has the capacity to be beneficial in a variety of different scenarios for a variety of different purposes. However, one difficulty with coded light is that it can be susceptible to inter-symbol interference.

SUMMARY

Particularly, it is recognized herein that signals to be sent using coded light are susceptible not only to inter-symbol interference experienced over the channel or in the receiver, but also in the transmitter.

In the input signal supplied by the encoder, symbols may be represented by different digital values specifying different discrete levels of some property of the LED current to be modulated (or more generally the current flowing through the light source), i.e. different gradations in that property. E.g. the levels in the input signal may represent different duty cycles with which to modulate the LED current according to the principle of pulse width modulation (PWM). Consider for example a ternary Manchester encoding scheme which has five possible symbols $\{-1, -\frac{1}{2}, 0, +\frac{1}{2}, +1\}$, and a limited number of possible transitions between these symbols (some transitions are not allowed). To represent the five symbols, the encoder supplies a signal in which different digital numerical levels indicate five different respective PWM duty cycles, e.g. 0.70, 0.75, 0.80, 0.85, 0.90. These correspond nominally to 70%, 75%, 80%, 85% and 90% of the maximum light intensity of the light source. However, due to the effect of inter-symbol interference caused at the transmit side (rather than the channel or receiver), the duty cycles specified by the encoder will not in fact result in exactly these intensities. Further, the amount of discrepancy is not even across all the symbols in the set.

To accommodate this effect, it is possible to compensate for the discrepancies, such as by multiplying the values in the input signal from the encoder by some correcting factor, or adding a correcting offset, with the degree of correction being different depending on the symbol value being corrected for. However, it is recognized herein that in itself, even this compensation will encounter a problem. Particularly, because of an inherent "memory effect" that will inevitably exist in the modulator circuit, as any circuit will typically include some explicit or parasitic capacitance and/or inductance). This means that the amount of energy stored in the capacitance and/or inductance will depend on the level of the most recent symbol. I.e. because the current driving the light source to represent a certain symbol is related to the current flowing to or from the capacitance or inductance, then after a symbol of a certain higher value is transmitted, this will leave the circuit with slightly different amount of stored energy than after a symbol of a certain lower value. This in turn affects the amount of energy discharged from the capacitance or inductance through the light source during the transmission of the subsequent symbol. Hence the previous symbol affects the amount of compensation that needs to be applied to the current symbol. In fact the effect is dependent on the particular combination of the previous symbol and the present symbol whose level is being compensated—i.e. it depends on the logical transition from the previous symbol to the present symbol.

Hence according to one aspect disclosed herein, there is provided a method of controlling an input signal supplied from an encoder to a modulator, wherein the input signal causes a current flowing through a light source and thereby embed data in light emitted by the light source, by modulating into the current a sequence of symbols each selected from amongst a discrete set of current levels according to an encoding scheme, and each resulting from a corresponding gradation in a property of the input signal; the method comprising: for each of a plurality of possible logical transitions allowed by the encoding scheme from an adjacently preceding one of the symbols to a present one of said symbols, determining a respective observed value for the current level of the present symbol; for each of said plurality of logical transitions, determining an associated error between the respective observed value and a corresponding one of a set of nominal values for the current levels; and based on the respective error for each of the plurality of logical transitions, applying a respective compensation to the corresponding gradation in the input signal in order to bring the resulting current level closer to the corresponding nominal value.

Preferably said plurality of possible logical transitions are all possible transitions allowed according to said encoding scheme.

In embodiments, the method may comprise: for each of a plurality of possible combinations of symbols allowed by said encoding scheme in a subsequence of a predetermined number N of contiguous symbols from a preceding one of said symbols n-N to a present one of said symbols n, determining a respective observed value for the current level of the present symbol n; for each of said plurality of combinations, determining an associated error between the respective observed value and the corresponding nominal value; and based on the respective error for each of said plurality of combinations, applying a respective compensation to the corresponding gradation of the input signal in order to bring the corresponding current level closer to the corresponding nominal value.

In embodiments, said plurality of combinations may be all possible combinations of N symbols given the logical transitions allowed according to said encoding scheme.

In embodiments, said current may be an average current and the modulator (20) controls the average current using pulse width modulation, and wherein said property in the input signal comprises a duty cycle of the pulse width modulation, the gradations in the input signal indicating different discrete values of the duty cycle.

In embodiments, the light source may be an LED-based light source, or other type such as a filament bulb.

In embodiments, the steps of determining of the observed values and determining the errors may be performed statically, e.g. based on a simulation of the modulator, by using the simulation to produce the observed values; and the step of applying the compensation is performed in a pre-compensation stage (either before the modulator is operating, or perhaps while the modulator is operating but using older compensation parameters). Alternatively the compensation may be based on actual characterizing the driver output by means of measuring device response to channel symbol sequences.

In embodiments, the steps of determining of the observed values, determining the errors and applying the compensation may be performed dynamically during operation of the encoder, modulator and light source, by using a measurement circuit to measure the observed values during said operation.

In embodiments, the step of applying the compensation may comprise setting a multiplicative correction factor or an additive correcting offset in a compensation module disposed between the encoder and modulator, arranged to adjust the gradations in the input signal prior to being input to the modulator.

In embodiments, the modulator may be implemented in a retrofittable add-on to a driver of the light source not in itself capable of modulating the light to embed data. Alternatively the modulator may be a pre-existing part of the light source along with the driver, but the application of said compensation may be performed by a retrofittable add-on to the modulator.

According to another aspect disclosed herein, there is provided an apparatus for controlling supply of an input signal from an encoder to a modulator, wherein the input signal causes modulation of a current flowing through a light source in order to embed data in light emitted by the light source, by modulating into said current a sequence of symbols each selected from amongst a discrete set of current levels according to an encoding scheme, and each resulting from a corresponding gradation in a property of the input signal; wherein the apparatus comprises: a measurement circuit configured, for each of a plurality of possible logical transitions allowed by said encoding scheme from an adjacently preceding one of said symbols to a present one of said symbols, to measure a respective observed value for the current level of the present symbol during operation of the modulator; and a compensation module configured, for each of said plurality of logical transitions, to determine an associated error between the respective observed value and a corresponding one of a set of nominal values for the current levels; wherein the compensation module is further configured to apply, based on the respective error for each of said plurality of logical transitions, a respective compensation to the corresponding gradation in the input signal in order to bring the resulting current level closer to the corresponding nominal value.

In embodiments, said apparatus may takes the form of a retrofittable add-on to a driver of the light source, where the light source is not in itself capable of modulating the light to embed data. In this case said add-on comprises the modulator along with the measurement circuit and compensation module.

Alternatively the modulator may be integrated into a driver of the light source (i.e. a pre-existing built-in part of the driver), and said apparatus may take the form of a retrofittable add-on to the modulator.

As another alternative, said apparatus comprises may comprise a driver of the light source, with the modulator, measurement circuit and compensation module all being integrated into the driver (i.e. all being built-in parts of the driver).

According to another aspect disclosed herein, there is provided an add-on module for retro-fitting to a driver of a light source, for embedding data in light emitted by the light source when the driver is not in itself capable of modulating the light to embed data; wherein the add-on module comprises: a modulator configured to modulate a current flowing through the light source and thereby embed data in the light emitted by the light source, by modulating into said current a sequence of symbols each selected from amongst a discrete set of current levels according to an encoding scheme, and each resulting from a corresponding gradation in a property of an input signal supplied from an encoder; a measurement circuit configured, for each of a plurality of possible logical transitions allowed by said encoding scheme from an adjacently preceding one of said symbols to a present one of said symbols, to measure a respective observed value for the current level of the present symbol during operation of the modulator; and a compensation module configured, for each of said plurality of logical transitions, to determine an associated error between the respective observed value and a corresponding one of a set of nominal values for the current levels; wherein the compensation module is further configured to apply, based on the respective error for each of said plurality of logical transitions, a respective compensation to the corresponding gradation of the input signal in order to bring the resulting current level closer to the corresponding nominal value.

According to another aspect disclosed herein, there is provided a driver for embedding data in light emitted by a light source, wherein the driver comprises: a modulator configured to modulate a current flowing through the light source and thereby embed data in the light emitted by the light source, by modulating into said current a sequence of symbols each selected from amongst a discrete set of current levels according to an encoding scheme, and each resulting from a corresponding gradation in a property of an input signal supplied from an encoder; a measurement circuit configured, for each of a plurality of possible logical transitions allowed by said encoding scheme from an adjacently preceding one of said symbols to a present one of said symbols, to measure a respective observed value for the current level of the present symbol during operation of the modulator; and a compensation module configured, for each of said plurality of logical transitions, to determine an associated error between the respective observed value and a corresponding one of a set of nominal values for the current levels; wherein the compensation module is further configured to apply, based on the respective error for each of said plurality of logical transitions, a respective compensation to the corresponding gradation of the input signal in order to bring the resulting current level closer to the corresponding nominal value.

According to another aspect disclosed herein, there is provided a computer-program product for controlling an input signal supplied from an encoder to a modulator, wherein the input signal causes modulation of a current flowing through a light source in order to embed data in light emitted by the light source, by modulating into said current a sequence of symbols each selected from amongst a discrete set of current levels according to an encoding scheme, and each resulting from a corresponding gradation in a property of the input signal; wherein the computer program product is embodied on a computer-readable storage medium and is configured so as when run on one or more processors to perform operations of: for each of a plurality of possible logical transitions allowed by said encoding scheme from an adjacently preceding one of said symbols to a present one of said symbols, determining a respective observed value for the current level of the present symbol; for each of said plurality of logical transitions, determining an associated error between the respective observed value and a corresponding one of a set of nominal values for the current levels; and based on the respective error for each of said plurality of logical transitions, applying a respective compensation to the corresponding gradation of the input signal in order to bring the resulting current level closer to the corresponding nominal value.

In embodiments, any of the method, the apparatus, the add-on module, the driver and/or the computer program product may further comprise features in accordance with any of the features disclosed above or elsewhere herein.

BRIEF DESCRIPTION OF THE DRAWINGS

To assist understanding of the present application and to show how embodiments may be put into effect, reference is made by way of example to the accompanying drawings in which:

FIG. 1 is a schematic block diagram of a system comprising a coded light transmitter and receiver, FIG. 2 is a schematic diagram of a non-modulating lighting device, FIG. 3 is a schematic diagram of a lighting device for modulating the light it emits in order to produce coded light, FIG. 4 is a sketch of an example coded light signal, FIG. 5 schematically illustrates a ternary Manchester coding scheme, FIG. 6 schematically illustrates an example signal coded using ternary Manchester.

DETAILED DESCRIPTION OF EMBODIMENTS

Figure 5:
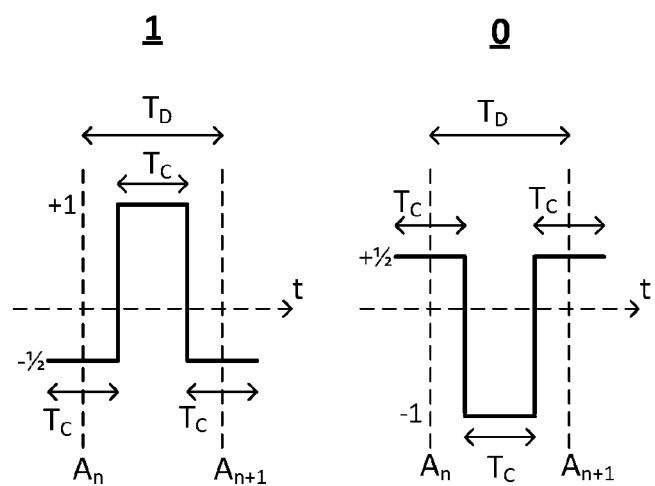

The following describes a system and method for coded light modulation which allows non-modulating LED drivers to be extended with a coded light add-on. It is based on a basic add-on circuit which itself inherently introduces inter-symbol interference, but in addition, the disclosed technique uses the known system dynamics to compensate for the inter-symbol interference in advance. This pre-compensation enables or increases the detectability of the message by improving the signal quality in terms of 'eye height' (to be discussed shortly in relation to FIGS. 7 and 8), which relates to the signal to noise ratio.

FIG. 1 gives a block diagram of a communication system comprising a transmitting device 2 arranged to emit visible light including embedded data, and a receiving device 4 arranged to receive the light emitted by the transmitting device 2 and detect the data embedded in the light. In embodiments the transmitting device 2 may take the form of a luminaire arranged to illuminate an environment such as a room or outdoor space, and also to encode data into the illumination it emits. However in alternative embodiments the transmitting device 2 may take any other form, such as a dedicated coded light emitter. The receiving device 4 may also take any suitable form, for example a mobile user terminal such as a smartphone, tablet or laptop having a built-in camera or other photo-sensor (e.g. photodiode) and installed with a suitable application ("app") for detecting the coded light signal in the light received by the camera or photosensor.

The transmitting device 2 comprises a light source 8 and an encoder 6 operatively coupled to the light source 8. In embodiments the light source 8 takes the form of an LED-based light source, comprising an LED or string of LEDs. Alternatively however the light source 8 could take another form such as a filament bulb. Either way, the encoder 6 is arranged to modulate the current flowing through the light source 8 via a driver (to be discussed shortly) and thereby modulate the level of the emitted light, i.e. to modulate the intensity of the emitted light). In the case of an LED or string of LEDs, the power of the emitted light is a function of the current flowing through the LED(s). E.g. in in typical LED light source the power of the emitted light is predominantly proportional (the linear term in the relationship is the predominant term). The encoder 6 is therefore arranged to control the light source 8 to transmit data to the receiving device 2 embedded in the light emitted by the light source.

The receiving device 4 comprises a light sensor 10 for receiving and sampling the light emitted by transmitting device 4, and a decoder 12 operatively coupled to the light sensor. The light sensor 10 may take the form of a camera such as a rolling-shutter camera (such as the case of a smartphone or tablet) or a global shutter camera. Alternatively the light sensor 10 may take another form such as a dedicated photocell. Either way, the decoder 10 is arranged to receive the samples captured by the light sensor 10 and to process the received samples in order to decode the data that has been modulated into the received light. Various techniques for detecting coded light using a rolling-shutter camera or other form of light sensor are in themselves known to a person skilled in the art. For the purpose of the present discussion, note that the decoder 12 comprises (amongst various other functions) a low-pass filter 14. This may be either explicitly included as a distinct, deliberate component, or may result as a side effect of another process in the receiving device. E.g. in embodiments using a camera for detection, the low pass behaviour may be an inherent sampling effect of a camera, with the exposure time defining the integrating (low pass) effect. Alternatively in case of a photodiode detector, a separate low pass filter may have to be added.

In embodiments each of the encoder 6 and the decoder 12 may take the form of software stored on one or more memory devices of the transmitting device 2 and receiving device 4 respectively, arranged to run on one or more processors of the transmitting device 2 and receiving device 4 respectively (memory and processors not shown). However, it is not excluded that one or both of these components could instead be implemented wholly or partially in dedicated hardware circuitry, or hardware configurable or reconfigurable circuitry such as a PGA or FPGA, or a combination of hardware and software.

FIG. 2 shows a high level block diagram of a typical non-modulating LED system, consisting of a power source 18, an LED driver 16 connected to the power source 18, and a light source 8 comprising a string of one or more LEDs connected to the LED driver 16. The driver 16 is connected so as to deliver from the power source 18 to the LED light source in a regulated manner.

FIG. 3 shows how a non-modulating LED system can be extended by adding a modulator block 20. The modulator 20 is connected between the driver 16 and the LED light source 8. The modulator 20 comprises at least a switching element 22 and an energy buffer 21, here in the form of a capacitor. The driver 16 comprises a first output terminal and a second output terminal for delivering the regulated power to the LEDs 8. The first output terminal of the driver 16 is connected to a first input terminal of the LED light source 8. The second output terminal of the driver 16 is connected to a first switched terminal of the switching element 22, while a second switched terminal of the switching element 22 is connected to a second input terminal of the LED light source 8. A connection between the first and second switched terminals of the switching element 22 can be switched on and off by a control signal applied to a third, control terminal of the switching element 22, thus selectively applying power to the LED light source 8 or not in dependence on the control signal. The control signal is applied (vicariously) under control of the encoder 6, thus enabling the encoder 6 to modulate the current supplied to the LEDs 8 in order to embed data. The capacitor 21 is connected between the first and second output terminals of the driver 16, in parallel across the output of the driver 16 (or put another way, such that when the switch 22 is closed the capacitor 21 is connected in parallel across the light source 8).

The capacitor, or more generally energy storing element 21, is included to act as an energy buffer as will be described shortly.

The switching element 22 either blocks or passes the flow of energy towards the LEDs 8. The average LED current, which can be linked to average light intensity, is modulated by varying the duty cycle, defined as the percentage or fraction of time at which the switch is in the pass (on) state relative to the off state. As will be familiar to a person skilled in the art, this technique is referred to as pulse width modulation (PWM).

As shown by an example data sequence in FIG. 4, in embodiments coded light uses a 5-level DC-free packet coding format referred to as ternary Manchester encoding (see the next paragraph regarding the DC free nature of the code). The data is transmitted in the form of packets 38 interspersed in time by an idle period 40 between each consecutive pair of packets. During the idle period 40 in between packets, the power consumed by the LEDs 8 is equal to the constant power delivered by the driver. During a negative symbol the duty cycle of the switching element, and hence the power consumed by the LEDs 8, is below average. The difference between the constant driver power and the smaller consumed power is stored in the capacitor (or more generally energy storing element) 21. When a positive symbol is transmitted, the system operates in the opposite way. During the modulation of a positive symbol, the LEDs consume more power than provided by constant driver power. The difference is supplied from the energy storing element 21.

The energy flowing in and out of the energy storing element 21 cancels each other due to the DC-freeness of the packets. That is to say (at least in an idealized case), every packet contains an equal number of positive and negative symbols, which results in the sum of the symbol energy within one packet to equal 0, which is the same level as during the idle periods 40. Note also that an idle period 40 between packets is not necessary in all possible embodiments, in which case it can still be said that the code is DC free in that regardless of the data content there are always an equal number of positive and negative channel symbols per packet (elementary symbols $T_C$). I.e. the code is not data dependent. As can be seen in FIG. 4, in the case where the data is packetized then in each packet the total of the symbol values in the packet always add up to zero, e.g. because there are the same number of +1 channel symbols as −1 symbols and the same number of +½ channel symbol as −½ symbols, or because a leading +½ and a trailing +½ will be compensated by one more −1 s than there are +1 s, or such like (more details of this symbol set to be discussed shortly). Or even if the data was not packetized, it can be seen the average symbol level is always the same for any two adjacent data bits regardless of whether 00, 01, 10 or 11.

The significance of a code being DC free is that it mitigates visible flicker (e.g. consider a situation where the average light output was alternating between one level during the packets 38 and another level during the idle periods, or if the average light level was fluctuating depending on the data content being sent at the time, this would cause the light to flicker at visibly low frequency). In general other DC free codes also exist which have the property of being non data dependent, in that that the average signal level per packet is always the same regardless of the content, and is equal to the output level during idle periods between packets; or in the case of no idle periods, that the average signal level over a certain small predetermined number of data bits or even a single data bit is the same regardless of the content. The teachings herein are applicable to any such codes or others, but by way of example the following will be described in terms of the ternary Manchester code.

The ternary Manchester scheme will now be discussed in more detail with reference to FIGS. 5 and 6.

The encoder 6 is arranged to receive non-encoded ("raw") data content to be encoded from a data source such as an application, and to encode this into an encoded stream of symbols of different symbol values (interspersed by idle periods 40 between packets 38). For example in a three-level code the symbols values are selected from amongst a set of symbol values −1, 0, +1; or in a five-level code as in ternary Manchester, the symbol values are selected from amongst a set of symbol values −1, −½, 0, +½, +1. The encoder outputs these in the form of duty cycle values (e.g. 0.70, 0.75, 0.80, 0.85, 0.90) for pulse width modulating the current through the LED light source 8 via the switch 22. The modulator 20 is arranged to receive this encoded signal and apply the pulse width modulation to the LED light source accordingly in accordance with the specified duty cycle values, and thereby modulate the data into the light emitted by the light source 8.

Ternary Manchester now forms a part of the state of the art and is thus known to a skilled person, but it is summarised again here for completeness. At the encoder 6, each data bit to be transmitted is mapped to a composite channel symbol in the form of a respective unit pulse. According to this scheme, there are two possible units, in the form of positive and negative "hat" functions as shown in FIG. 5. The pulse mapped to a data bit of value 1 is shown on the left hand side of FIG. 5, and the pulse mapped to a data bit of value 0 is shown on the right hand side of FIG. 5 (or the opposite mapping could just as well be used). A data bit is a bit of actual information to be conveyed in the transmission, sometimes referred to as "content data" or "user data" (even if not explicitly created by a user). The data bit period is labelled $T_D$ in FIG. 5, with the boundaries between user bit periods shown with vertical dashed lines.

Each unit pulse comprises a sequence of elementary channel symbols of length $T_C$ in time, smaller than the data bit period. Each elementary channel period consists of just one of the elementary levels that the coded signal can take, and is not alone sufficient to convey data (information) without being combined into a composite channel symbol. Hence each composite pulse of length $T_D$ is the smallest or most fundamental unit of information (user data) that can be conveyed on the channel using the coding scheme in question, and the elementary channel symbols of length $T_C$ are even smaller than this.

In the ternary Manchester code, each unit hat function (each composite channel symbol) comprises a sequence of three elementary channel symbols of length $T_C$ in time, each half the length of the data bit period $T_D$ ($T_D=2T_C$). The three elementary channel symbols for a respective data bit are contiguous, with the middle of the three being located at the centre of the respective data bit period, so that the adjacent first and third elementary channel symbols straddle the beginning and end boundaries of the data bit period $T_D$ respectively by half an elementary channel period $T_C$ either side.

Figure 6:
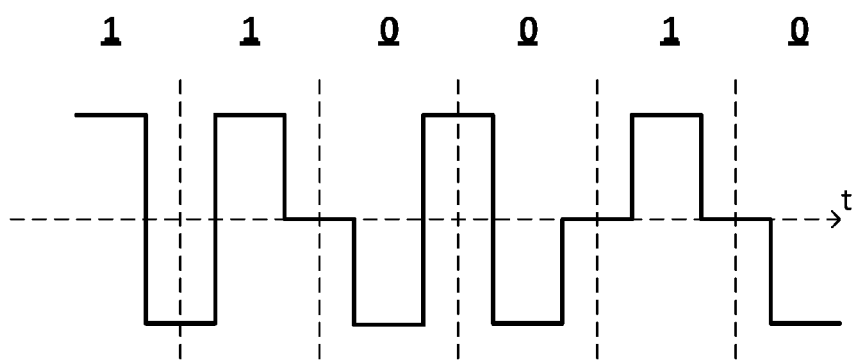

For a data bit of value 1, this is mapped to the positive hat function shown on the left of FIG. 5. The positive hat function comprises: a first elementary channel symbol of height −½ centred on the beginning (earlier) boundary of the respective data bit period $T_D$, followed by second (middle) elementary channel symbol of height +1 being centred on the respective data bit period $T_D$, followed by a third elementary channel symbol of height −½ centred on the end (later) boundary of the respective data bit period $T_D$. The "height" at this stage may be represented in any suitable terms such as a dimensionless digital value (ultimately to be represented by the modulated intensity).

For a data bit of value 0, this is mapped to the negative hat function shown on the right of FIG. 5. The negative hat function comprises: a first elementary channel symbol of height +½ centred on the beginning (earlier) boundary of the respective data bit period $T_D$, followed by second (middle) elementary channel symbol of height −1 being centred on the respective data bit period $T_D$, followed by a third elementary channel symbol of height +½ centred on the end (later) boundary of the respective data bit period $T_D$.

To create the encoded bitstream to be transmitted, the hat functions of adjacent user bits are added to one another, offset by the times of their respective bit periods $T_D$. Because the hat functions overlap across the boundaries between data bit periods, the functions add in the overlapping regions between adjacent data bits. That is, the hat functions are joined along the boundaries, so the earlier boundary $A_n$ of one data bit period is joined with the later bit boundary $A_{n+1}$ of the preceding adjacent data bit period, with the height of the signal being summed where the two adjacent pulses overlap. An example of a resulting sequence of channel symbols in the time domain is shown in FIG. 6. Another example is shown in the above-mentioned FIG. 4.

Where two adjacent data bits are of value 1, this means the two overlapping elementary channel symbols of height −½ add to a height of −1. Where two adjacent data bits are of value 0, the two overlapping elementary channel symbols of height +½ add to height +1. Where two adjacent data bits are of different values, the two overlapping elementary channel symbols of height +½ and −½ add to 0. Thus in the encoded stream, each user bit period (each unit pulse of information) takes the form of either a positive pulse of a rectangular wave when a user bit of value 1 is neighboured on either side by two adjacent user bits of value 1, or a negative pulse of a rectangular wave when a user bit of value 0 is neighboured by two adjacent user bits of value 0, or an uneven pulse of one or four possible configurations with straight edges when at least one of the adjacent user bits is different. Note also that at the edges of a packet, the +½ and −½ levels remain (e.g. see FIG. 4).

Conventionally, the resulting signal (e.g. that of FIG. 4 or 6) is then converted into a variation in the modulated intensity of the signal output by the transmitting light source, such as by pulse width modulating the LED current. Thus, elementary channel symbol −1 may be represented by a low light output level, the elementary channel symbol +1 may be represented by a high output light level, and the elementary channel symbol 0 may be represented by an intermediate light level between the high and low. The levels representing the +½ is equally spaced (i.e. half way) in between the +1 and 0 levels, and the level representing the −½ is equally spaced between the 0 and −1 levels.

In embodiments, each elementary channel symbol $T_C$ is represented by a fast back-and-forth switching, i.e. multiple periods of the pulse width modulation scheme at a corresponding duty cycle. Alternatively each elementary channel symbol $T_C$ could be represented by a single pulse width modulation period of the relevant duty cycle. Also, other forms of modulation other than pulse width modulation are possible, e.g. amplitude modulation. The following will be described in terms of pulse width modulation, but it will be appreciated this is not necessarily limiting.

The ternary Manchester code can be advantageous as it provides a smoother transition when the data bits change value than an old-fashioned binary Manchester code, and results in a spectrum in the frequency domain that is more suppressed around low frequencies the human eye is susceptible to perceive light variation. The less variation in the low frequency range, the better the quality of light. Particularly, ternary Manchester is not only DC free, but $DC^2$ free in that, in the frequency domain, not only does the distribution (energy vs frequency) go to zero at zero hertz, but also the gradient goes to zero at zero hertz.

Another equivalent way of describing the ternary Manchester scheme is that the modulation is composed of a sequence of bit symbols interleaved by a merging symbol leading into each bit symbol and a merging symbol leading out of each bit symbol and into the next temporally adjacent bit symbol, with each bit symbol and each merging symbol being an elementary channel symbol of duration $T_C$. Each bit symbol may be either a +1 represent a logic 1 or a −1 to represent a logic 0 (or vice versa); while the merging symbol may be either a −1, −½ or 0 leading into or out of a bit symbol 1, or a +1, +½ or 0 leading into or out of a bit symbol of 0. See for example the bit values 0 and 1 labelled in FIG. 4. The elementary channel symbols labelled 1 or 0 represent bits of data, and the elementary channel symbols in between are merging symbols which depend on the two temporally adjacent bits that they merge between. So in a packet, the first elementary symbol is a merging symbol, the second is a bit symbol, the third is a merging symbol, the fourth is a data symbol, and so forth (all odd elementary symbols are merging symbols and all even elementary symbols are bit symbols).

The present disclosure related to the problem of intersymbol interference (IR), from which the system in FIG. 3 suffers for example. The ISI occurs between elementary symbols $T_C$. ISI is a very common phenomenon in communication systems which negatively impacts the ability of the decoder 12 to distinguish the symbols in the received message. Unlike most communication systems however, in the present case the ISI is caused by the modulator 20 itself, instead of caused by the channel or receiver.

The ISI in the modulating system is caused by the voltage ripple appearing across the energy storing element 21. The voltage ripple influences the actual energy flow toward the LEDs 8, in that a larger voltage results in a larger LED power consumption.

When a negative (elementary) symbol has been modulated into the LED current, the duty cycle is shorter and so the switch 22 is open for longer. This means the energy storing element 21 is energized more by the driver 16 (e.g. the capacitor is charged more) over the duration of the symbol in question, resulting in an above average voltage appearing across the energy storing element 21. This above average voltage causes an additional increase in LED power consumption during the next (positive) symbol, when the excess energy stored in the energy storage element (e.g. excess charge stored in the capacitor) is discharged through the LEDs 8. I.e. the excess current is greater even than the intended amount nominally used to represent the positive symbol.

A converse effect also occurs when a positive symbol transitions to a negative symbol. If the encoder 6 increases the duty cycle in order to signal a positive symbol level, this means the switch 22 is closed for longer, and so more current is delivered to the energy storage element 21. So the energy stored in the energy storage element 21 is used and the voltage across it drops (e.g. the capacitor discharges). If the signal then transitions to a negative symbol, then at the start of this next symbol, there will be a lower than average voltage across the energy storage element 21. This below average voltage causes an additional decrease in LED power consumption, lower even than intended to represent a negative symbol.

Thus, the actual transmitted symbol energy is a function of the previous symbol(s).

Figure 7:
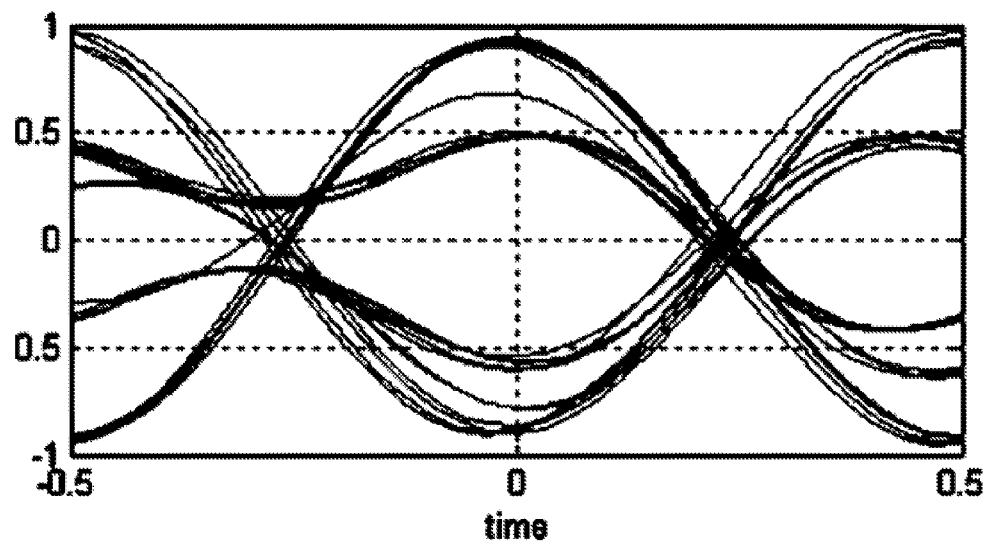
FIG. 7 is an eye diagram resulting from a non-compensated coded light signal.

FIG. 7 shows the eye diagram of a received 5-level {−1,−½, 0, +½, 1} coded light signal in a system suffering from ISI. The concept of an eye diagram will be familiar to a person skilled in the art. It shows, superimposed, the different waveforms that may be seen at the receiver 4 over a data symbol period $T_D$ once the received signal has passed through the low pass filter 14. For the purpose of the eye diagram, the waveforms are aligned in a "wrap around" fashion to be displayed as if in the same period $T_D$. Put in another way, the symbols from each composite data symbol period $T_D$ are all centred on t=0 in the eye diagram. Particularly, the time axis in FIG. 7 represents one data symbol period $T_D$ from half a merging symbol leading into a bit symbol, throughout the bit symbol, and onward to half a merging symbol leading out of the bit symbol (the period delineated by dotted lines in FIG. 6). This results in various possible waveforms for the different possible combinations of merging symbol leading into and out of the central bit symbol, e.g. 0→1→0, −½→1→0, etc. Thus in an eye diagram one should be able to see: five possible levels on the left hand side of the graph, corresponding to the five possible merging symbols (−1, −½, 0, +½, +1) leading into the central bit symbol; two possible levels in the centre of the graph, corresponding to the two possible bit symbols (−1, +1); and five possible levels on the right hand side of the graph, corresponding to the five possible merging symbols (−1, −½, 0, +½, +1) trailing the central bit symbol (though note that as it happens, there is no +½ symbol on the right hand side of FIGS. 7 and 8, just because there happens to be no trailing +½ merging symbol in the example data used).

Figure 8:
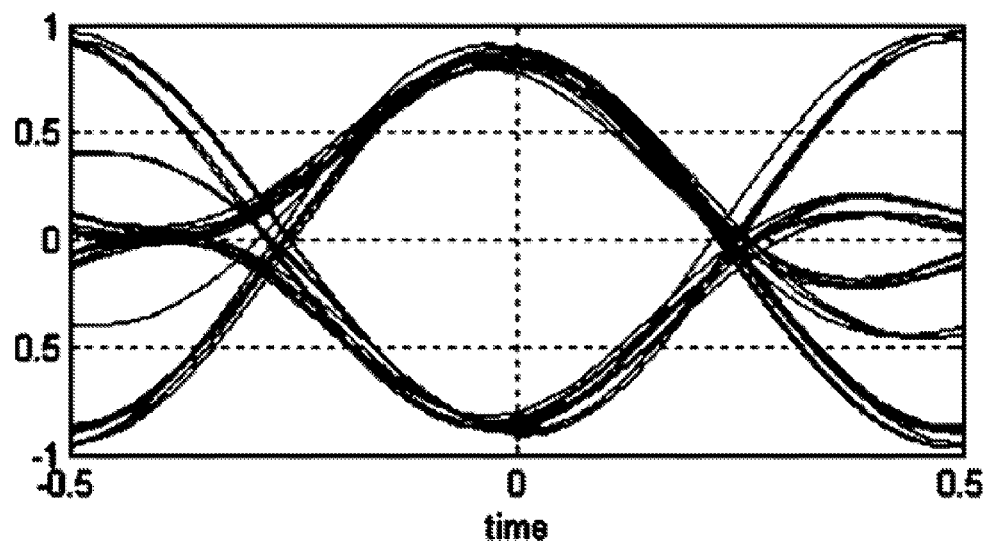
FIG. 8 is an eye diagram resulting from a coded light signal having a pre-compensation applied in accordance with embodiments of the present disclosure.

The waveforms resulting from the different symbols are not very distinct in FIG. 7, but will become clearer in FIG. 8. The fact that they do not appear very distinct in FIG. 7 demonstrates exactly the problem of ISI, that the different waveforms are not easily distinguished by the decoder 12 either. In FIG. 7, due to ISI the eye height is only 50% (inner eye height/outer eye height at sample moment t=0), which negatively impacts the ability to decode the message.

The following discloses a method of pre-compensation of the modulation errors caused by inter-symbol interference (ISI), where the ISI error for each symbol is a function of the previous symbol(s). The ISI errors can be compensated for if the errors are known, or at least approximately so.

In embodiments, the errors can be predicted by modelling the transmitting system 2 using a simulation. The transmitter 2 is then pre-configured with compensated levels for representing each of the elementary symbols, and a respective compensated level for each of the possible transitions into that symbol. In embodiments the levels being compensated (i.e. the gradations in the input signal) are PWM duty cycles (pulse widths), e.g. so a symbol value of 1 may be represented by a compensated PWM duty cycle of 0.89 instead of 0.9. Subsequently in operation, the transmitter 2 is then allowed to run in open-loop state using the pre-compensated values.

As presented above the compensation parameters are "static" and based on the simulation of the modelled system response to channel symbol transitions. More generally speaking the compensation effectively modifies/tweaks the resulting input signal to make the system output of the light emitting LEDs better match the intended output. In FIG. 3, this translates to the output of the ISI pre-compensated modulator block 20, i.e. the input to the LED light source 8 being adapted based on the channel symbol transitions. Notably a similar ISI pre-compensation may also be implemented incorporated into a driver with similar effect.

As an alternative to (or in addition to) predetermining the compensation based on a simulation, in embodiments the transmitter 2 can be extended by providing a circuit for measuring the resulting errors, in order to dynamically update the pre-compensation parameters using closed loop control, which makes the system less susceptible to deviations in the system dynamics. Examples of deviating parameters that influence the system dynamics are: average driver current (dimming level), different LED loads, component tolerances, temperature changes and component degradation. Different LED drivers with different output capacitances also influence the system dynamics.

FIG. 8 shows the increased signal quality when ISI is compensated based on the previous (n−1) to the next (n) symbol transition.

As shown, it is possible to compensate for the ISI by making the input signal level (e.g. PWM duty cycle) dependent on both the present symbol (the symbol in question, or the target symbol being encoded) and the previous symbol(s). Note also that a Manchester encoded message for example never shows a '1' symbol subsequent to another '1' symbol. In such case a symbol itself contains some information about the previous symbol.

Figure 9:
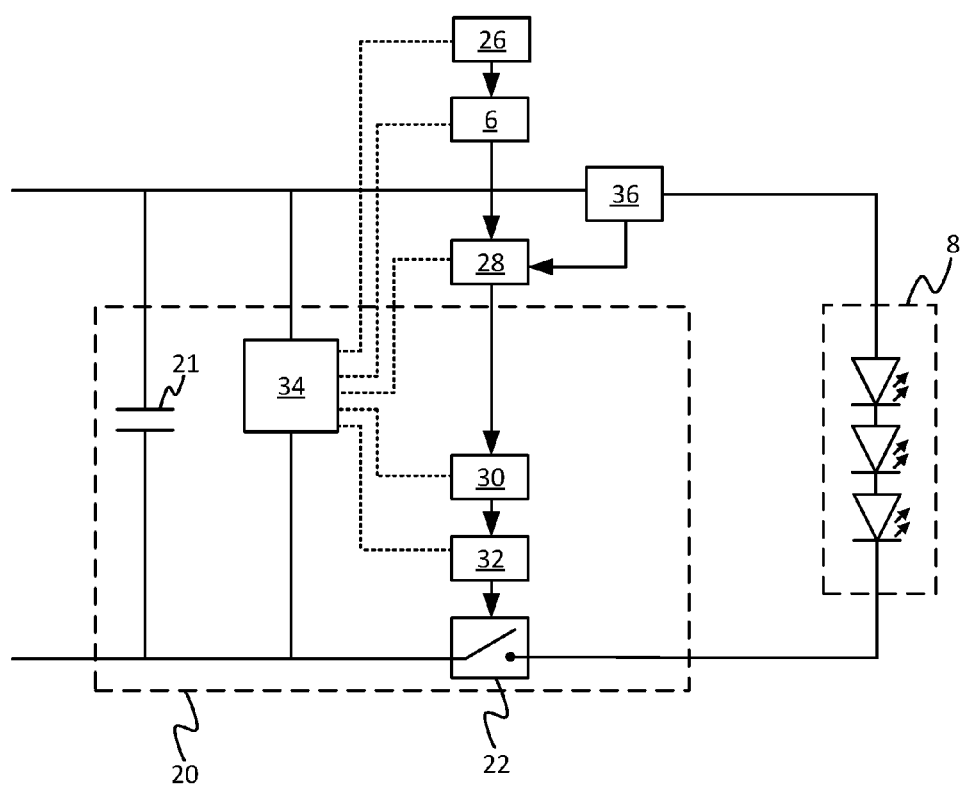
FIG. 9 is a schematic block diagram showing an ISI pre-compensated modulator block for connection between a driver and a light source.

FIG. 9 shows an example of an ISI pre-compensated modulator block 20, to be connected between the driver 16 and the LED light source 8. Note that one could also include the modulator block 20 inside the driver design.

The arrangement shown in FIG. 9 comprises, in addition to the components already described in relation to FIG. 3: a switch driver 32, a pulse width modulator (PWM) block 30, an ISI pre-compensator block 28, a message source 26, a measurement circuit 36, and an auxiliary power supply module 34. The switch driver 32 has an output coupled to the switching terminal of the switch 22, and is thereby arranged to drive the switch. The PWM block 30 has an output coupled to an input of the switch driver 32, and is thereby arranged to control, via the switch driver 32, when the switch 22 is on and when it is off, thus controlling when current is supplied to the LED light source 8 and when not. The PWM block is arranged to periodically switch the switching element 22 on and off, with a duty cycle set according to a duty cycle value specified at an input to the PWM block 30. This input is based on an encoded signal generated by the encoder 6, encoding a message generated by the message source 26 (e.g. a software application). The message from the message source 26 could be anything, depending on the application in question. E.g. the message could comprise an ID of the light source, or an indication of a geographic location of the light source, or a link to a website, or a human-readable text string, etc.

The switch driver 32, PWM block 30, and message source 26 (and possibly auxiliary power supply module 34) would anyway be features of the arrangement of FIG. 3, with the output of the encoder directly supplying the input to the PWM block 30. E.g. the encoder 6 outputs packets of data encoded using symbol selected from amongst the symbol set {−1, 0, +½, +1}, with these symbol values being represented in the signal supplied to the PWM block 32 using the gradations in the duty cycle level {0.7, 0.75, 0.8, 0.85, 0.9}. However, according to embodiments of the present disclosure, the transmitter 2 further includes a pre-compensator block 28 coupled between the output of the encoder 6 and the input of the PWM block 30. The pre-compensator 28 has an input arranged to receive the input signal from the encoder comprising the encoded symbol values expressed in terms of the (uncompensated) duty cycle levels (e.g. 0.7, 0.75, 0.8, 0.85, 0.9), and is configured to adjust these slightly to accommodate for the ISI effect discussed above in relation to FIG. 7. Particularly, the ISI pre-compensator 28 compensates for the ISI not only based on the present symbol being compensated, i.e. the target symbol, but also based on the previous modulated symbol(s) in the data being encoded. That is, there is a respective, independently-settable correction value mapped to at least each possible transition from the immediately preceding (adjacent) symbol n−1 to the present (target) symbol. An example of the mapping provided by the pre-compensator 28 is shown in the table below.

| Symbol n | Transition (symbol n − 1 to n) | Nominal duty cycle D representing symbol n (as appearing in encoded signal from encoder 6) | Corrected duty cycle k(n − 1, n) · D(n) | Correction k applied by pre-compensator 28 |
|---|---|---|---|---|
| −1 | 0 → −1 | 0.700 | 0.683 | 0.976 |
| −1 | ½ → −1 | 0.700 | 0.687 | 0.981 |
| −1 | 1 → −1 | 0.700 | 0.690 | 0.986 |
| −0.5 | 0 → −½ | 0.750 | 0.702 | 0.936 |
| −0.5 | 1 → −½ | 0.750 | 0.789 | 1.052 |
| 0 | −1 → 0 | 0.800 | 0.708 | 0.885 |
| 0 | −½ → 0 | 0.800 | 0.799 | 0.999 |
| 0 | 0 → 0 | 0.800 | 0.802 | 1.003 |
| 0 | ½ → 0 | 0.800 | 0.797 | 0.996 |
| 0 | 1 → 0 | 0.800 | 0.907 | 1.134 |
| 0.5 | −1 → ½ | 0.850 | 0.805 | 0.947 |
| 0.5 | −1 → ½ | 0.850 | 0.921 | 1.084 |
| 1 | −1 → 1 | 0.900 | 0.932 | 1.036 |
| 1 | −½ → 1 | 0.900 | 0.936 | 1.040 |
| 1 | 0 → 1 | 0.900 | 0.930 | 1.033 |

The correction k could be defined in any suitable terms, e.g. it could be a multiplicative factor such that the pre-compensator 28 outputs k(n−1, n)·D(n) to the PWM block 30, or it could be an additive offset such that the pre-compensator 28 outputs D(n)+k(n−1, n) to the PWM block 30. The PWM block 30 then uses these compensated symbol levels to create a drive signal with which it controls the switch driver 32 of the switching element 22.

Note that some logical transitions are not necessarily always possible according to any given encoding scheme: e.g. a ternary Manchester scheme there are five symbols, but in a typical application there are only fifteen possible transitions (e.g. 1→1, or −½→+½ does not happen in ternary Manchester). In some scenarios ternary Manchester may involve up to nineteen possible transitions, but the number is still limited to fewer than the total number of abstract mathematical permutations. The four additional transitions occur when the number of idle period symbols is configured to zero, so the trailing +/−½ packet symbol is followed immediately by a leading +/−½ symbol of the next packet. Hence the absolute maximum number of transitions in ternary Manchester is nineteen, but in practice in applications employing non-zero idle periods between packets, the maximum is fifteen.

In embodiments, an auxiliary power supply module 34 may be provided connected in parallel across the driver 16 and energy storing element 21, i.e. between the first and second terminals of the driver 16. Based on this, it is arranged to use a small amount of the power delivered by the LED driver 16 to power any one, more or all of the functional block 26, 6, 28, 30, 32 described above. The LED driver 16 will contain an auxiliary power supply 34 anyway to power its internal components. It is possible to power the functional blocks of the ISI pre-compensated modulator from the LED driver's auxiliary supply if its power budget is sufficient. However, this is not essential and in alternative embodiments a separate power source could be used; for example, via an additional communication or connection port (e.g. for control via DALI communication).

Note also that any one, some or all of the encoder 6, message source 26 and pre-compensator 28 may or may not be in-built components of the same retrofitted add-on unit as the modulator 20 block, which also comprises at least the switching element 22, switch driver 32 and PWM module 30, and optionally auxiliary power source 34 (alternatively the power source 34 could be a pre-existing component of the driver 16 or a separate power source could be used). As another alternative, the modulator 20 could be a built-in part of the LED driver 16, but the pre-compensator 28 could be a retrofitted add-on unit to the modulator 20. Or in yet further alternative embodiments, none of the components described above need be implemented in the form of an add-on unit, and could instead be built-in parts of the LED driver 16.

In embodiments, any one, more or all of the pre-compensator 28, encoder 6 and message source 26 may be implemented in the form of software stored on a computer-readable storage medium and arranged to run on one or more processors; or alternatively any one, more or all of these could be implemented in dedicated hardware circuitry, or configurable or reconfigurable circuity, or in a combination of hardware and software.

By whatever means implemented, the corrections k to be applied by the pre-compensator 28 are determined by comparing: (a) the nominal (idealized) levels of current flowing through the LED light source 8 that should ideally be used to represent the different symbol levels in order to communicate with no ISI and (b) observed levels corresponding to these nominal levels as observed in either a simulation or based on actual feedback during operation. As the compensation for each symbol is to be dependent on the previous (temporally adjacent) symbol, a separate observation and comparison are made for each of the different possible transitions. See for example the table below.

| Symbol n | Transition (symbol n − 1 to n) | Normalized current level representing symbol n (% of average driver current) This is the reference. | Observed current level | Error e |
|---|---|---|---|---|
| −1 | 0 → −1 | 0.875 | 0.919 | −0.044 |
| −1 | ½ → −1 | 0.875 | 0.903 | −0.028 |
| −1 | 1 → −1 | 0.875 | 0.888 | −0.013 |
| −0.5 | 0 → −½ | 0.938 | 0.960 | −0.023 |
| −0.5 | 1 → −½ | 0.938 | 0.925 | 0.012 |
| 0 | −1 → 0 | 1.000 | 1.039 | −0.039 |
| 0 | −½ → 0 | 1.000 | 1.015 | −0.015 |
| 0 | 0 → 0 | 1.000 | 0.997 | 0.003 |
| 0 | ½ → 0 | 1.000 | 0.980 | 0.020 |
| 0 | 1 → 0 | 1.000 | 0.961 | 0.039 |
| 0.5 | −1 → ½ | 1.063 | 1.075 | −0.013 |
| 0.5 | −1 → ½ | 1.063 | 1.031 | 0.031 |
| 1 | −1 → 1 | 1.125 | 1.105 | 0.020 |
| 1 | −½ → 1 | 1.125 | 1.086 | 0.039 |
| 1 | 0 → 1 | 1.125 | 1.068 | 0.057 |

This is an example of a coded light signal that contains fifteen transitions. In some niche situations up to nineteen transitions are possible (where the data is packetized with each packet starting or ending with a +/−½, but the inter-packet idle period is configured to zero—see previous explanation above).

The error e is the difference between the nominal current level for representing a given symbol and the observed current level for that symbol (as a function of the transition into that symbol). The compensation k to be applied by the pre-compensator 28 may then be determined as a function of e. For example this may be a multiplicative relationship such as $k(n-1, n)=\alpha \cdot e(n-1, n)$; or an additive relationship such as $k(n-1, n)=e(n-1, n)+\alpha$; where $\alpha$ is a constant. In embodiments, the error e can be measured based on a proportional-integral (PI) control loop—i.e. based on a sum of current and past errors. In that case $\alpha$ becomes an integrator part that converges over time such that the steady state error of each transitions becomes zero.

Note: the term "observed" herein is used in contrast to purely theoretical, analytical calculation; and it may refer to observation of a simulation, observation of an experiment, or observation of a dynamic measurement taken during actual operation. Note also that the observed values can be based on one or multiple different instants throughout the duration of the symbol interval, i.e. can be based on only one or multiple individual observations per symbol. In the case of multiple observations, these can be combined according to any suitable function, e.g. averaged (optionally based on a weighting function).

In embodiments, the observed current levels are determined not by observation of an instance of the modulator 20 in operation "in the field", but rather by a simulation of the transmitter system (driver 16, modulator 20 and LEDs 8). The simulation uses closed loop feedback to hone in on a set of corrections $k(n-1, n)$. As a first iteration it produces a first set of errors $e(n-1, n)$ and uses these to produce a first set of compensation values $k(n-1, n)$. It then produces a new set of errors e based on the symbol levels as compensated in the first iteration, and uses these to produce a second set of compensation values k, and so forth, over two or more iterations. The resulting compensation values k are programmed into the pre-compensator 28 prior to the (or an) operational stage—for example at the design stage, at manufacture, or as part of a commissioning or calibration stage of the transmitter 2 or modulator 20—i.e. while the modulator 20 or transmitter 2 is not in use but prior to a stage at which it will be used. After this, the transmitter 2 including its modulator 20 operates in only in an open loop configuration (no feedback of the error), but using the pre-compensated symbol levels pre-programmed based on the simulation stage.

Alternatively or additionally, deviations in the dynamics of the transmitter system (comprising the driver 16, modulator 20 and the LEDs 8) can be corrected by including a measurement circuit 36 in the transmitter 2 in order to measure the actual modulation output, thus forming a closed control loop. The measurement circuit 36 is connected in the same current path as the LED(s) of the LED light source 8, i.e. in series with them, and is configured to measure the current flowing along that path. Thus during operation of the modulator 20 in the transmitter 2, i.e. while the transmitter 2 is being actually being used to transmit coded light "in the field", the measurement circuit 36 is arranged to dynamically measure the current flowing through the LED(s) 8 and to feed this measurement back to the compensator block 28. The compensation block 28 uses the measurements from the measurement circuit 36 to collect together a first set of observed values for the different symbol levels, including a respective value for each possible transition into that symbol level. Based on this, it thus measures a corresponding set of errors $e(n-1, n)$, from which it computes a first set of compensation values $k(n-1, n)$, along the lines discussed in relation to the tables shown above. Then, as the modulator 20 continues operating to transmit further data using the newly compensated symbol levels, it continues to use the measurement circuit 36 to collect a new set of errors e and uses these to produce a second set of compensation values k, and so forth, over two or more iterations and in embodiments continually throughout operation of the transmitter system. The control loop can be designed such that the steady state error in transitions converges to zero over (a short) time. N.B. the "first" set of errors mentioned above does not necessarily have to be the initial set, but rather can just be the first obtained during measurement stage—optionally, in embodiments, the first set could be an iteration of an initial predetermined set of compensation values, predetermined prior to measurement as likely to be a good initial guess.

As with the pre-compensation module 28, the measurement circuit 36 may be part of the same retrofittable add-on unit as the modulator 20. Or alternatively if the modulator 20 is not retrofitted in an add-on unit but rather is a pre-existing, integral part of the driver 16, then the pre-compensation module 28 and measurement circuit 36 may nonetheless be implemented in a separate, retrofittable add-on unit which retrofits to the modulator 20. Or as another alternative, all the modulator 20, pre-compensator 28 and measurement circuit 36 may simply all be integral parts of the driver 16.

It will be appreciated that the above embodiments have been described only by way of example.

For instance, in the above examples, the compensation k is dependent only on the current symbol n and the previous symbol n−1. In fact, it is possible to extend the compensation further by taking the influence of older symbols (n−2 to n−N) into account as well, where N represents the total number of symbols whose history is included in computing k. Such extended compensation increases compensation complexity due to the larger number of symbol combinations to compensate for. On the other hand, compensating based on only one previous symbol only partially corrects for the ISI, but uses fewer resources compared to ISI compensation based on a longer history symbol transitions. Furthermore, the inventors have found that the benefit of compensation becomes rapidly smaller if the number of previous symbols taken into account is increased above 1.

Further, the applicability of the present disclosure is not limited to ternary Manchester and in other embodiments other coding schemes may be used, e.g. regular (binary) Manchester, or other line codes such as non return to zero (NRZ). Any encoding scheme can suffer from the problem of inter symbol interference, and any modulator or transmitter system may deliberately or inadvertently store energy such that the amount of ISI depends on the history of one or more past transitions into the present symbol being represented. Hence, the principle behind the present disclosure can apply to any encoding scheme.

Further, the applicability of the present disclosure is not limited to PWM, and in general the teachings herein can apply to other modulation mechanisms where some other property of the input signal (the input to switch 22 in the example of FIG. 3) is modulated to encode the symbols. For example amplitude modulation may be used, which also affects the signal energy and therefore the amount of energy being stored and discharged from one symbol to the next by the energy storing part(s) of the circuit (e.g. 21 in the example of FIG. 3). In this case the input levels (the gradations in the input signal) that are to be compensated are the amplitude levels rather than the duty cycles.

In another example, pulse position modulation may be used. E.g. a "low" symbol is represented by an earlier pulse within the symbol period and a "high" value is represented by pulse of the same shape but with a later timing offset within the symbol period (or vice versa). In such cases the property being modulated is the time offset of a pulse in the input signal, and the different input levels (gradations) used to represent symbols are different discrete values of the timing offset. The above techniques are also applicable here because, for example, a late pulse followed by an early pulse would create a different "energy memory" (e.g. in capacitor 21) than an early pulse followed by a late pulse, and hence the amount of distortion would again be channel symbol dependent and therefore user data dependent.

Furthermore, while the above has been described in terms of an LED-based light source 8, this is not limiting and in general other types of light source can be used to generate coded light, e.g. filament bulb.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of controlling supply of an input signal from an encoder to a modulator, wherein the input signal causes modulation of a current flowing through a light source in order to embed data in light emitted by the light source, by modulating into said current a sequence of symbols each selected from amongst a discrete set of current levels according to an encoding scheme, and each resulting from a corresponding gradation in a property of the input signal; wherein the method comprises:

for each of a plurality of possible logical transitions allowed by said encoding scheme from an adjacently preceding one of said symbols to a present one of said symbols, determining a respective observed value for the current level of the present symbol;

for each of said plurality of logical transitions, determining an associated error between the respective observed value and a corresponding one of a set of nominal values for the current levels;

based on the respective error for each of said plurality of logical transitions, applying a respective compensation to the corresponding gradation of the input signal in order to bring the resulting current level closer to the corresponding nominal value, wherein for each of a plurality of possible combinations of symbols allowed by said encoding scheme in a subsequence of a predetermined number N of contiguous symbols from a preceding one of said symbols n–N to a present one of said symbols n, determining a respective observed value for the current level of the present symbol n;

for each of said plurality of combinations, determining an associated error between the respective observed value and the corresponding nominal value; and based on the respective error for each of said plurality of combinations, applying a respective compensation to the corresponding input gradation of the input signal in order to bring the corresponding current level closer to the corresponding nominal value.

2. The method of claim 1, wherein said plurality of possible logical transitions are all possible transitions allowed according to said encoding scheme.

3. The method of claim 1, wherein said plurality of combinations are all possible combinations of N symbols given the logical transitions allowed according to said encoding scheme.

4. A method of controlling supply of an input signal from an encoder to a modulator, wherein the input signal causes modulation of a current flowing through a light source in order to embed data in light emitted by the light source, by modulating into said current a sequence of symbols each selected from amongst a discrete set of current levels according to an encoding scheme, and each resulting from a corresponding gradation in a property of the input signal; wherein the method comprises:

for each of a plurality of possible logical transitions allowed by said encoding scheme from an adjacently preceding one of said symbols to a present one of said symbols, determining a respective observed value for the current level of the present symbol;

for each of said plurality of logical transitions, determining an associated error between the respective observed value and a corresponding one of a set of nominal values for the current levels; and based on the respective error for each of said plurality of logical transitions, applying a respective compensation to the corresponding gradation of the input signal in order to bring the resulting current level closer to the corresponding nominal value, wherein said current is an average current and the modulator controls the average current using pulse width modulation, and wherein said property of the input signal is a duty cycle of the pulse width modulation, the gradations in the input signal indicating different values of the duty cycle.

5. The method of claim 1, wherein the light source is an LED-based light source.

6. A method of controlling supply of an input signal from an encoder to a modulator, wherein the input signal causes modulation of a current flowing through a light source in order to embed data in light emitted by the light source, by modulating into said current a sequence of symbols each selected from amongst a discrete set of current levels according to an encoding scheme, and each resulting from a corresponding gradation in a property of the input signal; wherein the method comprises:

for each of a plurality of possible logical transitions allowed by said encoding scheme from an adjacently preceding one of said symbols to a present one of said symbols, determining a respective observed value for the current level of the present symbol;

for each of said plurality of logical transitions, determining an associated error between the respective observed value and a corresponding one of a set of nominal values for the current levels; and based on the respective error for each of said plurality of logical transitions, applying a respective compensation to the corresponding gradation of the input signal in order to bring the resulting current level closer to the corresponding nominal value, wherein:

the steps of determining of the observed values and determining the errors are performed based on a simulation of the modulator, by using the simulation to produce the observed values; and the step of applying the compensation is performed in a pre-compensation stage.

7. The method of claim 1, wherein:

the steps of determining of the observed values, determining the errors and applying the compensation are performed dynamically during operation of the encoder, modulator and light source, by using a measurement circuit to measure the observed values during said operation.

8. A method of controlling supply of an input signal from an encoder to a modulator, wherein the input signal causes modulation of a current flowing through a light source in order to embed data in light emitted by the light source, by modulating into said current a sequence of symbols each selected from amongst a discrete set of current levels according to an encoding scheme, and each resulting from a corresponding gradation in a property of the input signal; wherein the method comprises:

for each of a plurality of possible logical transitions allowed by said encoding scheme from an adjacently preceding one of said symbols to a present one of said symbols, determining a respective observed value for the current level of the present symbol;

for each of said plurality of logical transitions, determining an associated error between the respective observed value and a corresponding one of a set of nominal values for the current levels; and based on the respective error for each of said plurality of logical transitions, applying a respective compensation to the corresponding gradation of the input signal in order to bring the resulting current level closer to the corresponding nominal value, wherein the step of applying the compensation comprises setting a multiplicative correction factor or an additive correcting offset in a compensation module disposed between the encoder and modulator, arranged to adjust the gradations of the input signal prior to being input to the modulator.

9. A method of controlling supply of an input signal from an encoder to a modulator, wherein the input signal causes modulation of a current flowing through a light source in order to embed data in light emitted by the light source, by modulating into said current a sequence of symbols each selected from amongst a discrete set of current levels according to an encoding scheme, and each resulting from a corresponding gradation in a property of the input signal; wherein the method comprises:

for each of a plurality of possible logical transitions allowed by said encoding scheme from an adjacently preceding one of said symbols to a present one of said symbols, determining a respective observed value for the current level of the present symbol;

for each of said plurality of logical transitions, determining an associated error between the respective observed value and a corresponding one of a set of nominal values for the current levels; and based on the respective error for each of said plurality of logical transitions, applying a respective compensation to the corresponding gradation of the input signal in order to bring the resulting current level closer to the corresponding nominal value, wherein:

the modulator is implemented in a retrofittable add-on to a driver of the light source not in itself capable of modulating the light to embed data; or the modulator is a pre-existing part of the light source along with the driver, but the application of said compensation is performed by a retrofittable add-on to the modulator.

10. Apparatus for controlling supply of an input signal from an encoder to a modulator, wherein the input signal causes modulation of a current flowing through a light source in order to embed data in light emitted by the light source, by modulating into said current a sequence of symbols each selected from amongst a discrete set of current levels according to an encoding scheme, and each resulting from a corresponding gradation in a property of the input signal; wherein the apparatus comprises:

a measurement circuit configured, for each of a plurality of possible logical transitions allowed by said encoding scheme from an adjacently preceding one of said symbols to a present one of said symbols, to measure a respective observed value for the current level of the present symbol during operation of the modulator; and a compensation module configured, for each of said plurality of logical transitions, to determine an associated error between the respective observed value and a corresponding one of a set of nominal values for the current levels;

wherein the compensation module is further configured to apply, based on the respective error for each of said plurality of logical transitions, a respective compensation to the corresponding gradation in the input signal in order to bring the resulting current level closer to the corresponding nominal value, and wherein said apparatus takes the form of a retrofittable add-on to a driver of the light source not in itself capable of modulating the light to embed data, said add-on comprising the modulator along with the measurement circuit and compensation module.

11. Apparatus for controlling supply of an input signal from an encoder to a modulator, wherein the input signal causes modulation of a current flowing through a light source in order to embed data in light emitted by the light source, by modulating into said current a sequence of symbols each selected from amongst a discrete set of current levels according to an encoding scheme, and each resulting from a corresponding gradation in a property of the input signal; wherein the apparatus comprises:

a measurement circuit configured, for each of a plurality of possible logical transitions allowed by said encoding scheme from an adjacently preceding one of said symbols to a present one of said symbols, to measure a respective observed value for the current level of the present symbol during operation of the modulator; and a compensation module configured, for each of said plurality of logical transitions, to determine an associated error between the respective observed value and a corresponding one of a set of nominal values for the current levels;

wherein the compensation module is further configured to apply, based on the respective error for each of said plurality of logical transitions, a respective compensation to the corresponding gradation in the input signal in order to bring the resulting current level closer to the corresponding nominal value, wherein the modulator is integrated into a driver of the light source, and said apparatus takes the form of a retrofittable add-on to the modulator.

12. The apparatus of claim 10, wherein said apparatus comprises a driver of the light source, and the modulator, measurement circuit and compensation module are all integrated into the driver.

13. A non-transitory computer-program product for controlling supply of an input signal from an encoder to a modulator, wherein the input signal causes modulation of a current flowing through a light source in order to embed data in light emitted by the light source, by modulating into said current a sequence of symbols each selected from amongst a discrete set of current levels according to an encoding scheme, and each resulting from a corresponding input gradation in a property of the input signal; wherein the computer program product is embodied on a computer-readable storage medium and is configured so as when run on one or more processors to perform operations of: for each of a plurality of possible logical transitions allowed by said encoding scheme from an adjacently preceding one of said symbols to a present one of said symbols, determining a respective observed value for the current level of the present symbol; for each of said plurality of logical transitions, determining an associated error between the respective observed value and a corresponding one of a set of nominal values for the current levels; and based on the respective error for each of said plurality of logical transitions, applying a respective compensation to the corresponding gradation of the input signal to bring the resulting current level closer to the corresponding nominal value.

* * * * *